United States Patent [19]

Hoole

[11] Patent Number: 4,864,549
[45] Date of Patent: Sep. 5, 1989

[54] MICROCOMPUTER TIMER

[76] Inventor: Morris L. Hoole, 6633 S. Washington St., Littleton, Colo. 80121

[21] Appl. No.: 17,311

[22] Filed: Feb. 20, 1987

[51] Int. Cl.⁴ .............................................. G04F 3/00
[52] U.S. Cl. ..................................... 368/10; 368/107; 368/8; 368/90
[58] Field of Search ................ 368/10, 6, 7, 8, 89–120

[56] References Cited

U.S. PATENT DOCUMENTS

| | | | |
|---|---|---|---|
| 2,735,005 | 7/1956 | Steele | 250/29 |
| 3,279,480 | 3/1966 | Jarvis | 133/8 |
| 4,176,739 | 8/1979 | Corcoran, Jr. | 194/9 T |
| 4,367,051 | 2/1983 | Inoue | 368/111 |
| 4,541,519 | 9/1985 | Belviso et al. | 194/1 N |
| 4,640,624 | 5/1987 | Pitt | 368/111 |

*Primary Examiner*—Bernard Roskoski
*Attorney, Agent, or Firm*—Norvell E. Von Behren

[57] ABSTRACT

A single chip programmable microcomputer timer for use in car washers, air dispensing machines, pay showers, suntan salons, vacuum equipment and the like. The timer unit is designed with a 4,000 bit microcomputer chip and contains a large scale integrated (LSI) circuit comprising a central processing unit (CPU), a read only memory (ROM) for program storage and a random access memory (RAM) for general data usage. The microcomputer functions to display a friendly message to the user of the timer and to display a diagnostic message on the timer's visual display when an error is recognized by the computer. The computer will flash the visual display at a predetermined time near the end of the cycle. Two programming buttons on the timer permit the coin inventory to be examined and/or cleared in conjuction with a nonvolatile memory designed in the computer. The computer also performs other functions all of which make the timer a very useful device for its many possible applications.

5 Claims, 3 Drawing Sheets

MICROCOMPUTER TIMER

BACKGROUND OF THE INVENTION

This invention relates generally to a timing device and more particularly to a new and novel single chip microcomputer timer for use in conjunction with a coin-operated device and other exterior devices such as car washers, air dispensing machines, pay showers, suntan salons, vacuum equipment and the like.

Mechanical, electronic and combination timing devices have been in use for many years as evidenced by U.S. Patent Office class 194, subclasses 9, 16 and 18. Such devices are designed to turn on and off exterior devices after insertion of a coin or coins in a coin-operated device.

Add and subtract counters are also known as evidenced by U.S. Pat. No. 2,735,005 issued on Feb. 14, 1956 to F. G. Steele and assigned to Northrop Aircraft, Inc. of Hawthorne, California. Such counters are used in digital computers and count up and down depending on the sign of the pulse fed into the counter.

Electronic coin totalizers are known as evidenced by the U.S. Pat. No. 3,279,480 issued on Oct. 18, 1966 to J. R. JARVIS and assigned to Meter-All Mfg. Co., Inc. of Dallas, Texas. Devices such as this accept coins of different denominations and when the value of the deposited coins accumulates to a certain sum, then a signal is generated to initiate an operation of a coin-operated machine.

Coin actuated timers with audio output are taught in the U.S. Pat. No. 4,176,739 issued on Dec. 4, 1979 to Edward J. Corcoran. This timer provides an audio output at the end of a predetermined time period selected by the user and is responsive to coins inserted into the apparatus.

A coin-operated, elapsed timer is taught in the U.S. Pat. No. 4,541,519 issued on Sept. 17, 1985 to Vinent Belviso et al and represents the closest prior art uncovered by the applicant in his prior art search. This timer is capable of receiving additional coins at any time while counting down and continuously displays the time remaining on the timer and gives a warning at a predetermined time, that the set time has run out.

In the preliminary examination of this patent application by the U.S. Patent Office, the U.S. Pat. Nos. 4,640,624 and 4,367,051 were cited. The device taught in Pat. No. 4,640,624 issued to Peter N. E. Pitt on Feb. 3, 1987, is an electronic timer computer used by road race runners which indicates cumulative time and other times useful to the runner. The device taught in Pat. No. 4,367,051 issued to Akigoro Inoue on Jan. 4, 1983, is a relative time interval measuring instrument capable of simultaneously measuring a plurality of time intervals and providing displays of differences between the shortest one and the others along with their ranking.

Programmable microcontrollers are known in the art as evidenced by the advertising literature from EDN Magazine, Pages 135–138, dated Nov. 27, 1986. The microcontroller HD63701XOP used in the applicant's new and novel timer is distributed by Hitachi America, Ltd., Semiconductor and IC Division, 2210 O'Toole Avenue, San Jose, CA 95131.

SUMMARY OF THE INVENTION

While the prior art devices as hereinbefore described appear to be suitable for the purposes intended, the applicant's new and novel microcomputer timer is capable of being used as a timing device for coin-operated devices such as, but not limited to, car washing, air dispensing machines, pay showers, suntan salons, vacuum equipment among others.

The novel invention uses a single 4,000 bit microcomputer chip No. HD63701XOP and designated as U4 on FIG. 4 of the applicant's drawings. The microcomputer comprises at least three circuit boards positioned within a molded sytrene case which has a visual display clearly visible to the user of the equipment.

The novel single chip microcomputer contains a large scale integrated (LSI) circuit comprising at least a central processing unit (CPU), a read only memory (ROM) for program storage and a random access memory (RAM) for general data usage. The LSI circuit functions to display a friendly message, such as HI DROP COIN IN SLOT, and displays a diagnostic message on the visual display when an error is recognized by the computer such as a stuck coin, a computer memory loss and a slug.

The novel single chip microcomputer also flashes the visual display at a predetermined time near the end of the timed cycle and may also activate an external horn to warn the user that the set time is about to expire. The visual display also indicates the time set on the timer unit and the microcomputer permits the timer to wait a predetermined time to see if more coins have been deposited before turning on the output for the timed cycle.

Two programming buttons are positioned on the rear of the timer and are used to signal to the microcomputer to perform the following functions:

a. examine and/or clear the coin inventory, b. change the time given by the timer unit for each coin deposited in the coin-operated device, c. change the number of coins required to start the timed cycle, and d. modify coin security parameter in the microcomputer.

The novel single chip microcomputer also contains a nonvolatile memory in case of a power interruption to the computer power source. This feature permits the computer to keep track of coin inventory in the coin-operated device by counting each coin as the coin is deposited in the coinoperated device by the user of the timer. The coin inventory can be examined on the visual display from outside of the timer unit by signaling to the microcomputer by waving a strong magnet over the visual display.

The applicant's novel timer is small, dependable and is programmable and user friendly. The amount of time remaining is always known thereby reducing customer frustration and irritation. The user is able to pace himself so as to finish his job in the time purchased and he is able to add more coins to purchase additional time before the equipment shuts off.

Accordingly it is an object and advantage of the invention to provide a new and novel single chip microcomputer timer which is user friendly and has diagnostic capabilities and also is programmable by a pair of program buttons at the rear of the timer.

Another object and advantage of the invention is to provide a new and novel visual display timer with a single chip microcomputer having a nonvolatile memory which permits coin inventory to be monitored and examined on a visual display by waving a strong magnet over the visual display.

Yet another object and advantage of the invention is to provide a new and novel timer that displays a message of HI DROP COIN IN SLOT to the user and can also display a diagnostic message to the owner of the device thereby making servicing of the device easier.

Still yet another object and advantage of the invention is to provide a new and novel timer that is capable of flashing a visible display near the end of the timed cycle to warn the user of the approaching end of this time with the timer capable of also sending a signal to an external horn for further warning.

A further object and advantage of the invention is to provide a new and novel timer that has the ability to wait a predetermined time after insertion of coins to see if more coins are inserted before beginning the timed cycle.

These and other objects and advantages will become apparent from a study of the drawings and from a review of the description of the preferred embodiment following hereinafter.

DESCRIPTION OF THE PREFERRED EMBODIMENT

Figure 1:
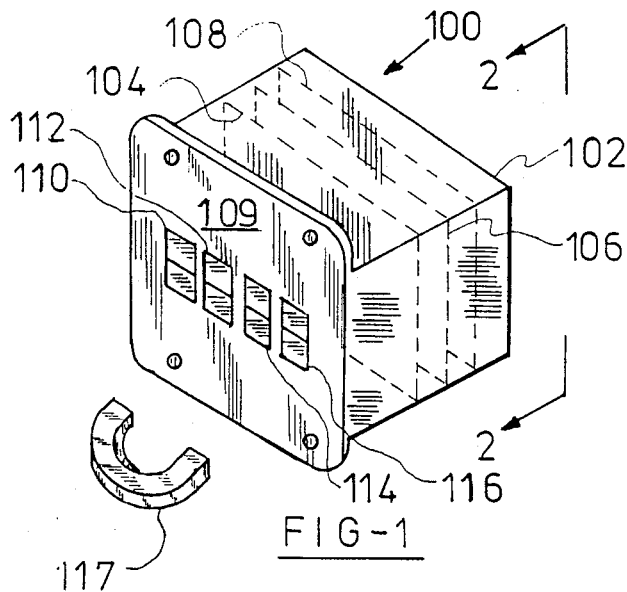
FIG. 1 is a perspective view of the applicant's single chip microcomputer timer showing the visual display comprising four display devices.
Figure 2:
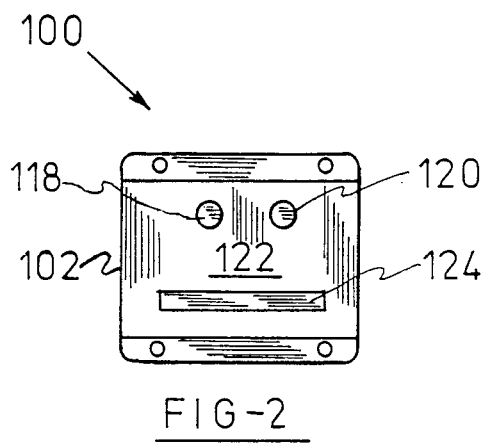
FIG. 2 is a rear elevational view taken along line 2—2 of FIG. 1 showing the two programming buttons used with the microcomputer.

Referring now to the drawings in general and in particular to FIGS. 1 and 2 of the drawings, there is shown in FIG. 1 a perspective view of the applicant's novel single chip microcomputer timer generally by the numeral 100 which comprises a custom molded styrene case 102 and which is self-contained and has positioned therein three basic circuit components 104, 106 and 108 shown generally by the dashed lines in FIG. 1.

The case 102 also has positioned behind the front face 109 a plurality of visual display devices 110, 112, 114 and 116 which are clearly visible to the user of the timer. The display devices may be liquid crystals, light emitting diodes, vacuum fluorescents and others within the spirit and scope of the invention. A magnet 117 may be used with the timer 100 as will be described hereinafter.

Figure 3:
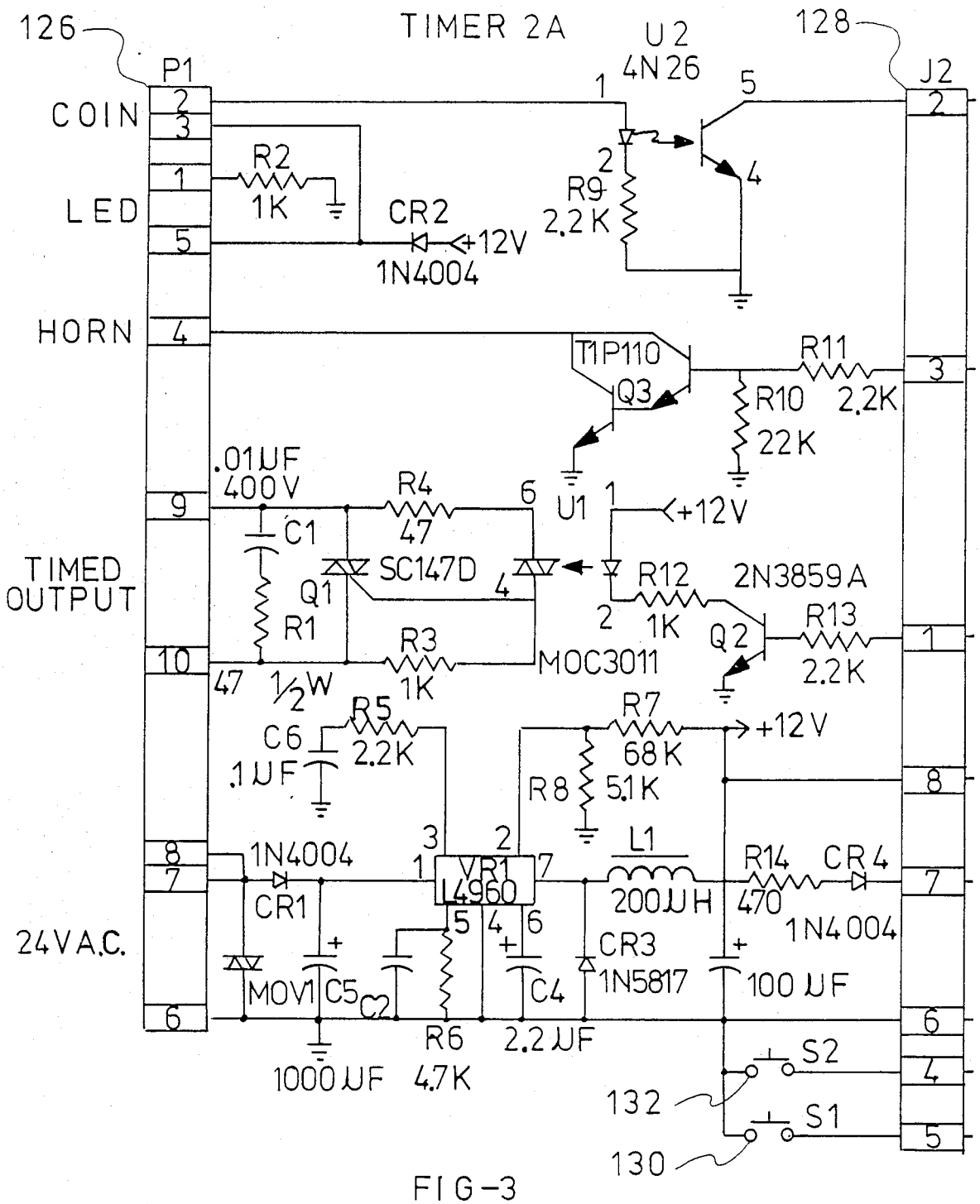
FIG. 3 is an electrical schematic showing the power circuit board of the subject microcomputer.

Referring now to FIG. 2 of the drawings there is shown a rear elevational view taken along line 2—2 of FIG. 1. A pair of programming buttons 118 and 120 are exposed on the rear face 122 of the case 102 and are used as before described to program the single chip microcomputer. A junction block connection 124 is also contained on the rear face 122 of the case 102 and is used to connect to exterior devices as shown in FIG. 3. The junction block P1 of FIG. 3 would connect to the junction block connection 124.

Referring now to FIG. 3 of the drawings there is shown an electrical schematic detailing one of the three before described circuit boards 104, 106 and 108 of the applicant's single chip microcomputer. The circuit board shown in FIG. 3 is the power board of the applicant's invention and contains two junction blocks labeled P1 and J1 which are also designated numerically 126 and 128 respectively. The two programming buttons 118 and 120 are connected to the two switches S1 and S2 and numbered 130 and 132 respectively. The junction block J2 numbered 128 in FIG. 3 would be connected to a matching junction block J3 numbered 134 on the circuit board shown in FIG. 4 which is the computer chip circuit board. The single computer chip designated as U4 and shown numerically as 136 is numbered by the manufactuere of the computer chip as HD63701XOP. A typical chip of this type is manufactured by Hitachi America, Ltd., Semiconductor and IC Division in San Jose, California.

Figure 5:
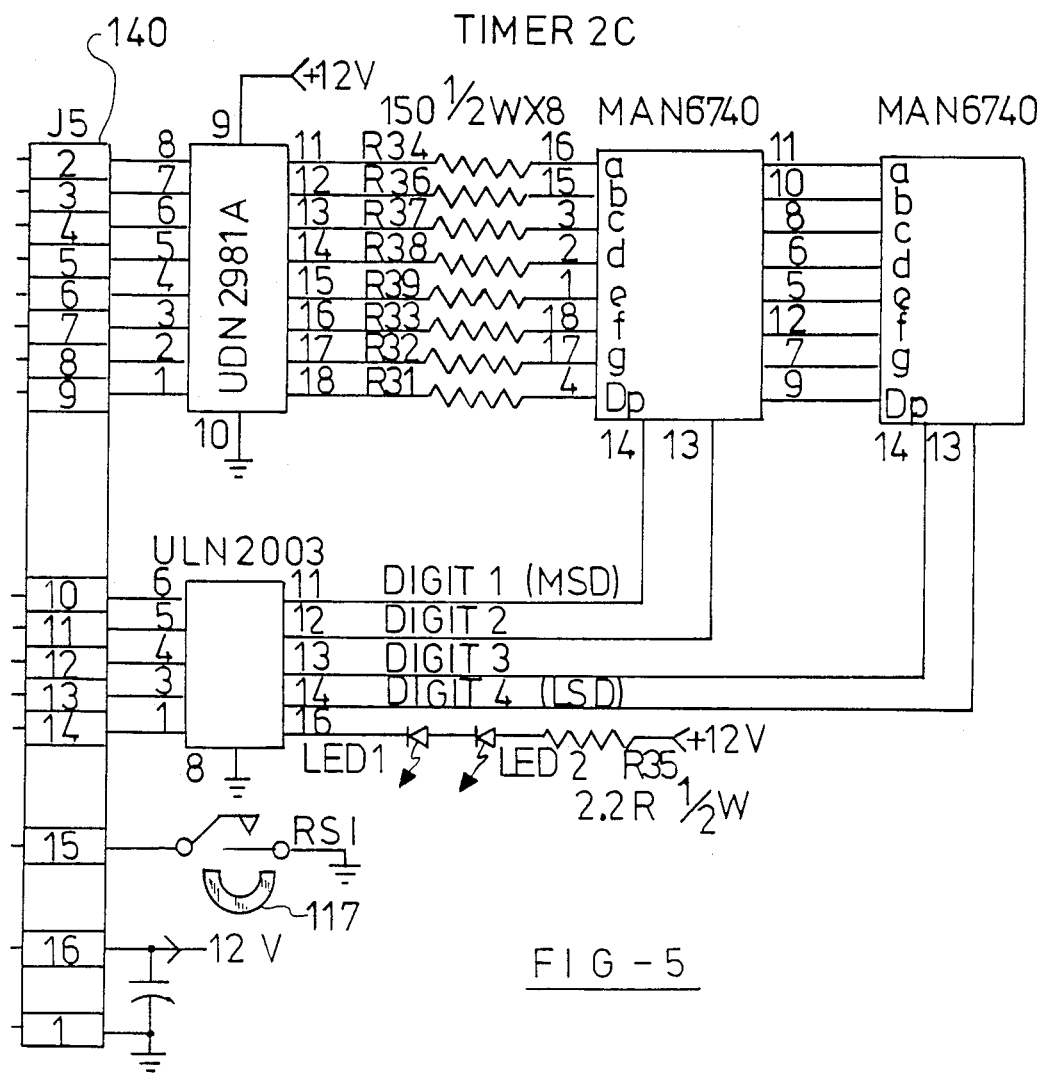
FIG. 5 is an electrical schematic showing the display circuit board of the subject microcomputer.
Figure 4:
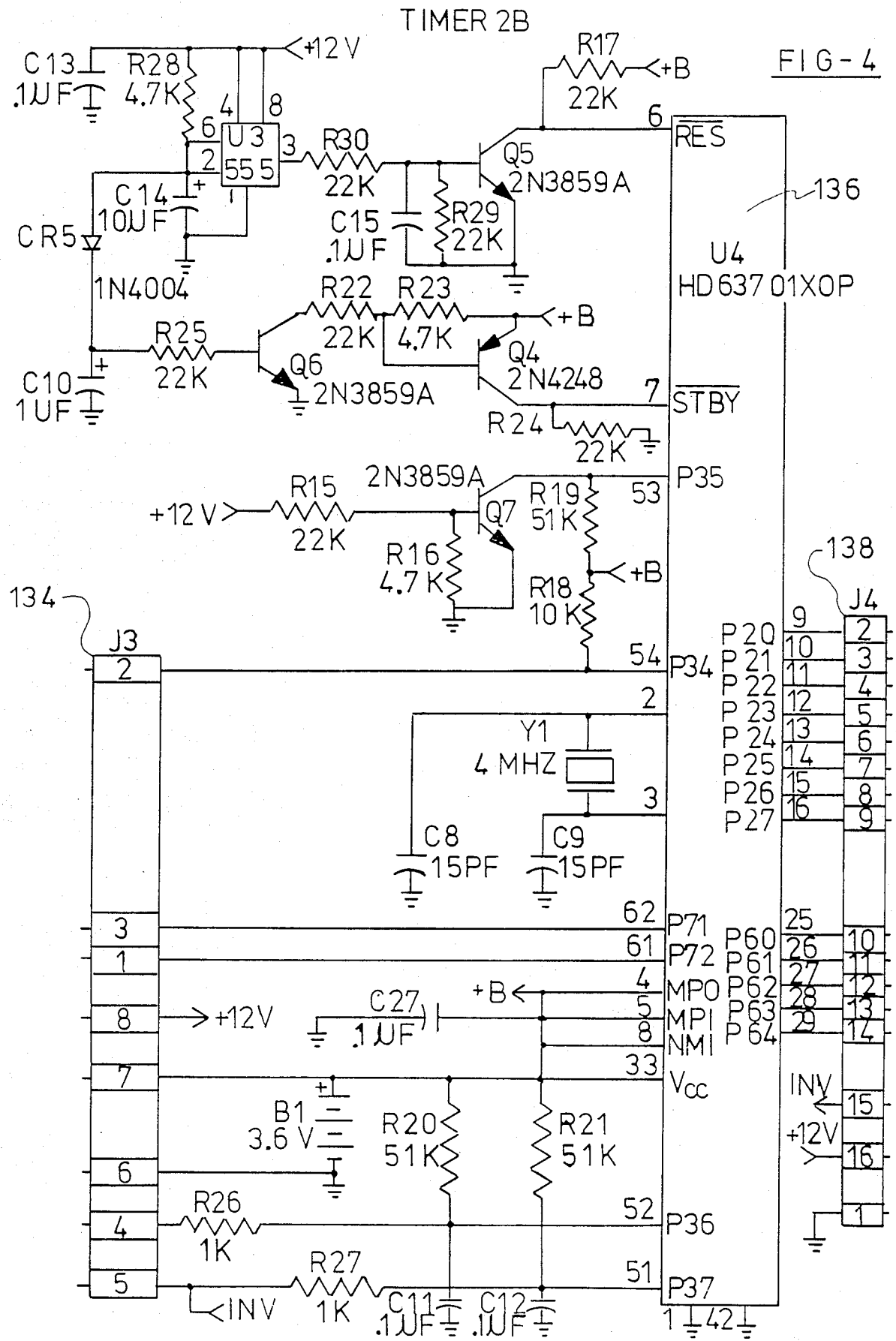
FIG. 4 is an electrical schematic showing the computer chip circuit board of the subject microcomputer.

A junction block J4 which is numbered 138 on FIG. 4 is used to connect to a matching junction block J5 shown in FIG. 5 which is numbered 140. The circuit board shown in FIG. 5 is the power circuit board of the applicant's novel single chip microcomputer.

When formed thusly, the single chip microcomputer comprises the three circuit boards as shown in FIGS. 3-5 and are connected to each other by means of the junction blocks J2, J3, J4 and J5 numbered consecutively 128, 134, 138 and 140. When the external devices are connected to the novel microcomputer timer at the junction block P1 numbered 126 in FIG. 3, the applicant's device will function as hereinbefore described.

OPERATION

In operation the timer 100 may be connected to various types of coin acceptors and warning devices such as a horn through the junction block P1 numerically designated 126 in FIG. 3. The internally contained single chip microcomputer functions to accept coins from the coin acceptor only that have the proper on/off signal timing as set by the microcomputer. Until this happens, the visual display 110, 112, 114 and 116 will display a friendly message to the customer on its display. The preferred display would be HI DROP COIN IN SLOT.

When a proper coin signal is detected by the microcomputer, the computer program indicates on the display a preset time which is set by the owner of the timer. The present time would be in Minutes and Seconds and the computer program would wait to see if the customer deposits more coins. If so, the computer program adds additional time to the customer's cycle and indicates the new time on the display.

This process continues until the computer realizes the customer has stopped depositing coins after which the timing function begins. The delay period was added to prevent the cycle from beginning until the customer was ready.

As the timing function begins, the computer program indicates to the customer the time remaining in the cycle on the visual display 110, 112, 114 and 116. The computer program then updates the visual display as the time continues. At any time the customer may add additional time to the cycle by depositing as many coins as desired. The computer program reflects the additional time by adding it to the time remaining on the display.

As the customer uses the external device connected to the timer, the computer program watches the time remaining and flashes the visual display 110, 112, 114 and 116 to indicate to the customer that the cycle is near completion. The timer may also sound an external warning device such as a horn, to further attract attention to the final minute of the timed cycle. The computer program beeps the horn only a few times as to not annoy the customer. When the times cycle is completed, the computer program shuts off the control output and returns to flashing the friendly message HI DROP COIN IN SLOT on the visual display.

In the event of a power failure, the nonvolatile computer memory may be employed to know exactly what was happening at the time of failure and the program picks up from where it left off which prevents an accidental abortion of the customer's cycle. The nonvolatile memory also allows the computer program to keep track of coin inventory in the exterior coin acceptor by counting each coin as it is deposited.

The owner of the timer may examine the inventory from the outside of the timer case 102 by simply signaling to the computer program by waving a strong magnet 117 over the visual display 110, 112, 114 and 116. This feature is handy in installations where access to the rear of the timer 100 is difficult or inconvenient to the owner of the timer. The coin inventory can also be examined by pushing one of the programming buttons on the rear face 122 of the timer 100.

With access to the two programming buttons 118 and 120 on the rear face 122 of the case, the timer owner may do any of the following:
 a. examine and/or clear the coin inventory
 b. change the time given for each coin
 c. change the number of coins required to start the cycle, and
 d. modify the coin security parameters.

The computer program will aid the owner of the timer in servicing the system by displaying a diagnostic message when an error is recognized. The error could have been a coin stuck in the coin sensor, a computer memory loss or a slug detected in place of a coin. In the event of a stuck coin, the computer program is smart enough to recognize if the error has corrected itself and if so, the computer program will be back to the normal running mode.

From the foregoing description of the preferred embodiment and from a review of the drawing circuits shown in FIGS. 3-5, it is felt that a person skilled in the art is able to see and understand the novel concepts presented herewith in the applicant's single chip microcomputer timer. It is recognized however that changes may be made in the circuitry and the timer structure within the spirit and scope of the invention. The applicant is not to be limited to the embodiment shown which has been given by way of illustration only.

Having described my invention, I claim:

1. In a timer unit of the type contained within a case and having a visual display in the case and designed for use in conjunction with a coin-operated device and designed to function primarily to turn on and off, after a time cycle, exterior devices such as car washers, air dispensing machines, pay showers, suntan salons, vacuum equipment and the like, the timer also being designed to perform other functions in addition to the primary function, the improvement comprising:
 a. the timer unit being designed with a single chip pmicrocomputer containing a large scale integrated (LSI) circuit comprising at least the following:
  (1) a central processing unit, (CPU),
  (2) a read only memory (ROM) for program storage,
  (3) a random access memory (RAM) for general data usage;
 b. the LSI circuit functioning to perform at least one of the following functions upon activation:
  (1) display a friendly message to the user of the timer on the visual display,
  (2) display a diagnostic message on the visual display when an error is recognized by the computer; and
  (3) flash the visual display at a predetermined time near the end of the timed cycle; and
 c. the microcomputer having a nonvolatile memory in case of a power interruption to the computer power source, the nonvolatile memory permitting the computer to keep track of coin inventory in the coin-operated device by counting each coin as the coin is deposited in the coin-operated device by the user of the timer;
  (1) the coin inventory being capable of being examined on the visual display from outside of the timer unit by signaling to the microcomputer by waving a strong magnet over the visual display.

2. The improvement as defined in claim 1 further comprising the timer unit containing at least two programming buttons accessible on the rear of the timer, the buttons being designed to signal to the microcomputer so that the microcomputer will perform at least one of the following functions:
 a. examine and/or clear coin inventor,
 b. change the time given by the timer for each coin deposited in the coin-operated device,
 c. change the number of coins required to start the timed cycle and
 d. modify coin security parameter in the microcomputer.

3. The improvement as defined in claim 1 wherein the microcomputer is able to compute an error and to display a code for one or more of the following diagnostic messages relating to the error which is then displayed on the visual display:
 a. stuck coin
 b. computer memory loss, and
 c. slug 4. The improvement as defined in claim 1 wherein the LSI circuit functions as follows:
 a. to sound an audible alarm at a predetermined time near the end of the timed cycle,
 b. to indicate time set on the timer unit,
 c. to wait a predetermined time to see if more coins have been deposited in the coin-operated device before starting output indicating time on the timer unit, and
 d. to indicate time remaining on the timer unit.

5. A timer unit for use with an exterior coin-operated device and designed to primarily function to turn on and off other exterior devices such as car washers, air dispensing machines, pay showers, suntan salons, vacuum equipment and the like, comprising:
 a. a case having positioned therein a single chip microcomputer comprising a plurality of circuit boards, the case having positioned inside thereof for access to the outside thereof at least two programming buttons, the case also having positioned therein a visual display for viewing from the exterior of the case, the programming buttons and the visual display being electrically connected to the microcomputer;

b. the microcomputer containing a large scale integrated (LSI) circuit comprising at least a central processing unit (CPU), a read only memory (ROM) for program storage, and a random access memory (RAM) for general data usage;
c. the LSI circuit functioning to perform the following functions upon activation:
   (1) display a friendly message to the user of the timer on the visual display,
   (2) display a diagnostic message on the visual display when an error is recognized by the computer; and
   (3) flash the visual display at a predetermined time near the end of the timed cycle;
d. the two programming buttons being designed to signal to the microcomputer to perform the following functions:
   (1) examine and/or clear the coin inventory,
   (2) change the time given by the timer unit for each coin deposited in the coin-operated device,
   (3) change the number of coins required to start the timed cycle,
   (4) modify coin security parameter in the microcomputer;
e. the microcomputer functioning to compute an error in the timer unit and to display a code for one or more of the following diagnostic messages relating to the error which is then displayed on the visual display:
   (1) stuck coin
   (2) computer memory loss
   (3) slug;
f. the microcomputer also functioning to perform the following:
   (1) indicate on the visual display a time set on the timer unit;
   (2) wait a predetermined time to see if more coins have been deposited in the coin-operated device before indicating on the visual display, time on the timer unit;
   (3) indicate, on the visual display, time remaining on the timer unit,
   (4) turn on and off the other exterior devices at a predetermined time; and
g. the microcomputer having a nonvolatile memory in case of a power interruption to the computer power source, the nonvolatile memory permitting the computer to keep track of coin inventory in the coin-operated device by counting each coin as the coin is deposited in the coinoperated device by the user of the timer:
   (1) the coin inventory being capable of being examined on the visual display from outside of the timer unit by signaling to the microcomputer by waving a strong magnet over the visual display.

* * * * *